2,848,795
FRICTION ELEMENTS

Francis J. Lowey, Rocky River, Ohio, assignor to American Brake Shoe Company, New York, N. Y., a corporation of Delaware No Drawing. Application June 23, 1955
Serial No. 517,645

3 Claims. (Cl. 29—182.5)

This invention relates to powdered metal friction elements, and in particular to such friction elements in the form of brake linings, clutch facings and the like.

Friction elements produced from powdered metals are advantageously used particularly under circumstances where high operating temperatures are encountered, as where a moving body having a great deal of momentum is to be rapidly decelerated by braking. The energy to be dissipated by braking is high, and therefore unusual wear strength of the powdered metal friction element is required. Conventionally, powdered metal friction elements for such purposes have been produced largely of metal powders affording a copper or bronze base, but there are circumstances as the foregoing where it is necessary to have a greater wear strength than that afforded by a copper or the bronze base material. Moreover, the high temperatures encountered in these instances tend to cause low melting point copper or bronze in effect to weld to the opposing member that is associated with and adapted to be engaged by the copper or bronze base powdered metal friction element as a friction couple. Thus, appreciable amounts of the low melting point powdered metal facing are picked up by the opposing member when the friction couple is engaged.

The primary object of the present invention is a powdered metal friction element having unusual wear strength and a high degree of heat resistance consistent with the foregoing requirement, that is, one which does not display any marked tendency to weld to the opposing member of the friction couple at the temperatures ordinarily encountered and one which is extremely strong from a wear resistance standpoint. Specifically, it is the object of the present invention to produce a powdered metal friction element primarily of powdered iron to which has been added molybdenum sulfide and aluminum oxide in relatively small amounts.

Other and further objects of the present invention will be apparent from the following description and claims which, by way of illustration, show preferred embodiments of the present invention and the principles thereof and what I now consider to be the best mode in which I have contemplated applying these principles. Other embodiments of the invention embodying the same or equivalent principles may be used and changes may be made as desired by those skilled in the art without departing from the present invention and the purview of the appended claims.

Under and in accordance with the present invention, a powdered metal friction element is produced by pressing and sintering in the usual way powdered iron and molybdenum sulfide as essential ingredients. A small amount of powdered tin is preferably utilized to assist in the production of a more solid and coalesced metallic matrix, and likewise small amounts of powdered lead and carbon, as afforded by powdered graphite, are added to the powdered mixture to modify the frictional qualities of the finished powdered metal friction element. Unusual wear strength, high heat resistance, and anti-weld properties are attained by incorporating molybdenum sulfide in the mixture. These properties appear to be advantageously affected by highly refractory and abrasive material in the form of aluminum oxide added to the mixture to be pressed. It appears that the refractory abrasive thus provided not only contributes to heat resistance at high temperatures where softening of the sintered iron is likely to occur, but also increases the coefficient of friction, wear resistance and the desirable anti-weld property.

A preferred formulation is as follows:

| Powdered component: | Parts by weight |
|---|---|
| Iron | 80 |
| Tin | 5 |
| Lead | 2 |
| Molybdenum sulfide | 2 |
| Aluminum oxide | 3 |
| Carbon | 4 |

A mixture of the foregoing kind is first compressed in a mold cavity under high pressure (10 to 15 tons per square inch) in the usual fashion, thus producing a densified, relatively weak briquette or so called green compact having the desired dimensions of the finished article, and as was mentioned this is a friction element represented by a brake lining, clutch facing or the like. After the briquette has been produced, this is then sintered for several hours at a temperature of from 1800° to 1900° F., and preferably a pressure of about 250 pounds per square inch is maintained at this time. Variations from the foregoing formula are of course possible and may be desired in some instances. Thus, the amount of tin is not critical and may be varied appreciably between two and nine parts by weight, since tin serves primarily to assist in the production of a more solid metallic matrix, and the amount of tin may therefore be varied with this in mind. Likewise, lead, and carbon which in part is a friction modifier, may be varied somewhat, but I have found that in these instances the amounts specified in the above examples are optimum quantities. Two parts by weight of molybdenum sulfide represents approximately the lowest amount based on the high quantity of iron present. The amount of molybdenum sulfide may be as high as six parts by weight, but in the main two parts by weight are sufficient to enhance those characteristics of the friction element that are desirable for high energy applications as set forth above.

The matrix is entirely ferrous metal, probably carburized to some extent by the carbon present, and doubtlessly alloyed with tin. However, lead is only a friction modifier and not strictly a matrix or base ingredient.

I am presently unable exactly to account for the enhancement of strength, heat resistance, and the anti-weld qualities that are achieved by molybdenum sulfide, and as appear to be further enhanced by addition of aluminum oxide. It is doubtful that the aluminum oxide undergoes any change during sintering, and hence this refractory abrasive appears primarily to impart high friction to the friction element and to promote what is initially attained by the molybdenum sulfide. Moreover, it is known that molybdenum sulfide under some conditions operates as a lubricant, but this of itself would not represent increased strength or heat resistance, and therefore it might possibly be the case that molybdenum sulfide is in some way transformed whole or in part or actually partakes of combination with iron during the sintering process. That this may be so is evidenced by the fact that a powdered metal friction element prepared from a mixture of the foregoing kind is stronger than one produced from the same formula but which omits molybdenum sulfide, and it is doubtful that this is due merely to inclusions of unaltered molybdenum sulfide in the finished article.

A further advantage of the friction element produced in accordance with the present invention is that the enhanced heat resistance that is imparted in the iron matrix enables the powdered metal facing to be thermally bonded to a high heat strength steel core or a backing member such as a clutch disc, brake shoe, or the like. For the same reason, the facing is amenable to subsequent heat treatments such as a quench and draw of the aforementioned steel core having the powdered metal friction element of the present invention bonded thereto.

The friction element produced in accordance with the present invention is exceedingly hard and strong. It is virtually incapable of being machined or abraded, and cannot be cut by carbide cutting tools in contrast to the powdered metal friction elements of the prior art. Hence, the friction element of the present invention is particularly useful for heavy duty, high temperature requirements. The opposing element or mating member must be at least a high heat strength, low-carbon steel, since the friction element of the present invention will unduly wear cast iron.

Thus, while I have described preferred embodiments of the present invention, it is to be understood that these are capable of variation and modification, and I, therefore, do not wish to be limited to the precise details set forth, but desire to avail myself of such changes and alterations as fall within the purview of the following claims.

I claim:

1. A mixture of powdered metals adapted to be pressed and sintered for the production therefrom of powdered metal friction elements and consisting essentially of the following ingredients of approximately minimum proportions and ratio: 80 parts by weight of iron for producing essentially an iron matrix; 2 parts by weight of tin for assisting in the attainment of coalesced iron matrix; 2 parts by weight of lead and 4 parts by weight of graphite as a mixture of friction modifiers; and 2 parts by weight of molybdenum sulfide and 3 parts by weight of alumina which together impart high strength and hardness to the iron matrix, enhanced heat resistance, and desirable anti-weld characteristics preventing welding of such a friction element to the opposing friction part in use.

2. A powdered metal friction element produced from pressed and sintered powdered ingredients and consisting essentially of the following in minimum proportion and ratio: 80 parts by weight of powdered iron, and 2 parts by weight of powdered tin binding and coalescing the iron into a dense, hard essentially iron matrix; said matrix containing 2 parts by weight of lead and 4 parts by weight of graphite serving as friction modifiers; and said matrix containing 2 parts by weight of molybdenum sulfide and 3 parts by weight of alumina together imparting high strength to said matrix, imparting high heat resistance to the friction element as a whole, and imparting anti-weld characteristics to the wear face of said friction element thereby preventing undue welding of the wear face of the friction element to the opposing friction member in use.

3. An iron base powdered metal friction element adapted to engage an opposing member in a friction couple operating under high energy conditions and produced from pressed and sintered powdered ingredients and consisting essentially of: a dense, hard, essentially iron matrix consisting essentially of pressed and sintered iron powders; and said matrix containing at least about 2 parts by weight of molybdenum sulfide and at least about 3 parts by weight of alumina for approximately every 80 parts by weight of powdered iron; said molybdenum sulfide and said alumina being pressed and sintered with the iron matrix and together imparting to said friction element high strength and enhanced heat resistance and friction, and imparting anti-weld characteristics to the wear face of said friction element thereby preventing undue welding of the wear face of the friction element to the opposing friction member in use.

References Cited in the file of this patent

UNITED STATES PATENTS

| | | |
|---|---|---|
| 2,072,070 | Fisher | Feb. 23, 1937 |
| 2,284,785 | Wilkey | June 2, 1942 |
| 2,300,118 | Hensel et al. | Oct. 27, 1942 |
| 2,367,404 | Kott | Jan. 16, 1945 |
| 2,408,430 | Lowey et al. | Oct. 1, 1946 |
| 2,480,076 | De Marinis | Aug. 23, 1949 |